United States Patent [19]

Schwarz et al.

[11] Patent Number: 4,781,394
[45] Date of Patent: Nov. 1, 1988

[54] TRAILER HITCH GUIDE

[75] Inventors: Peter W. Schwarz, Idaho Falls; Lance L. Hall, Shelley, both of Id.

[73] Assignee: Universal Concepts, Inc., Idaho Falls, Id.

[21] Appl. No.: 55,696

[22] Filed: May 29, 1987

[51] Int. Cl.⁴ .............................................. B60D 1/12
[52] U.S. Cl. ...................................... 280/477; 280/507
[58] Field of Search ................... 280/477, 478 R, 507, 280/511, 432; 293/117

[56] References Cited

U.S. PATENT DOCUMENTS

| | | | |
|---|---|---|---|
| 2,409,399 | 10/1946 | Solon | 280/477 |
| 3,420,549 | 1/1969 | Robinson | 280/477 |
| 3,522,958 | 8/1970 | Lusignan | 280/511 |
| 3,884,055 | 5/1975 | Vuillemot | 70/58 |
| 4,183,548 | 1/1980 | Schneckloth | 280/433 |
| 4,226,438 | 10/1980 | Collins | 280/477 |
| 4,417,748 | 11/1983 | Dortsch | 280/477 |

Primary Examiner—John A. Pekar
Attorney, Agent, or Firm—Fitch, Even, Tabin & Flannery

[57] ABSTRACT

A trailer hitch for attachment to a vehicle bumper for providing releasable coupling with a trailer coupling member. The hitch includes a coupling ball partially surrounded by an enclosure extending above the top of the coupling ball. A safety bar is received in slots formed in the surrounding wall. The safety bar, when installed, overlies the coupled arrangement of a ball joint and trailer coupling member so as to prevent their unintended separation. Further, the walls surrounding the coupling ball are pivotally mounted to the vehicle bumper and include a spring which contacts either the vehicle or its bumper to orient the enclosing walls in a preferred direction.

8 Claims, 2 Drawing Sheets

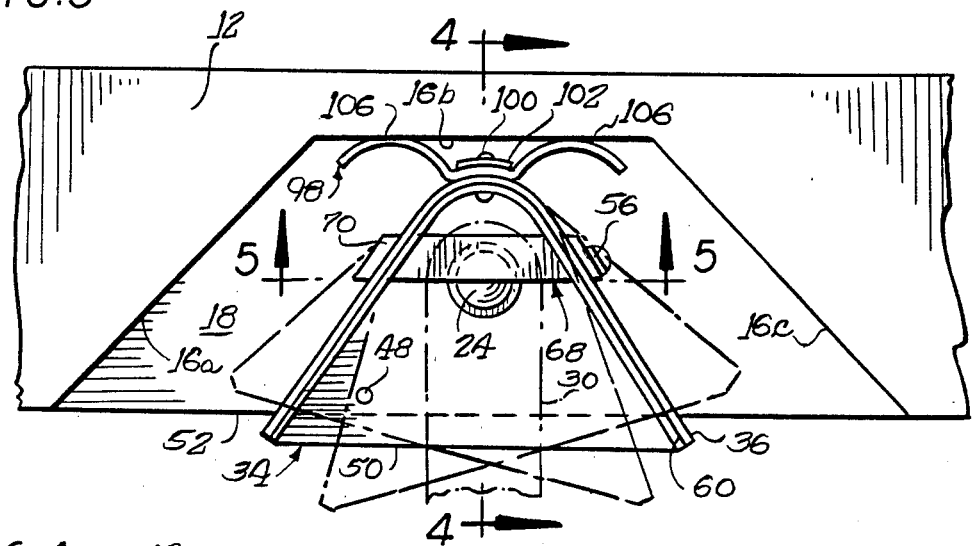
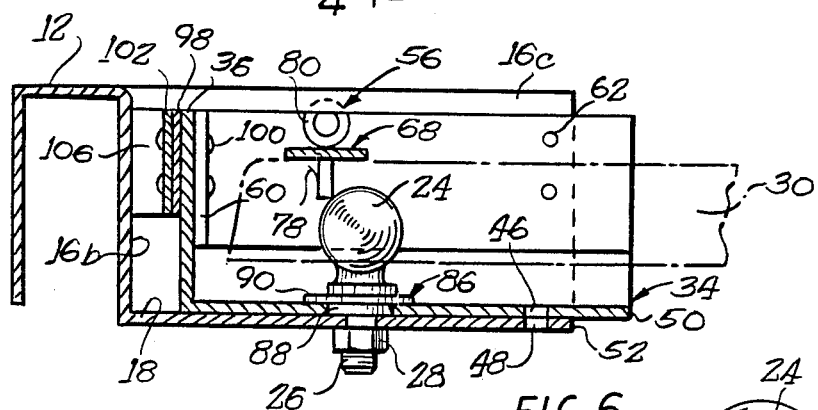
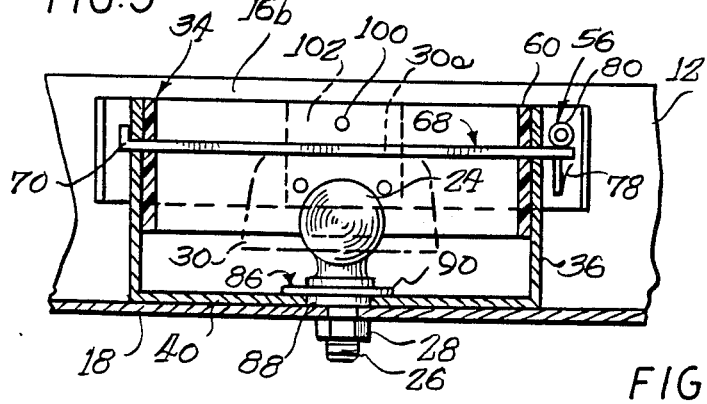
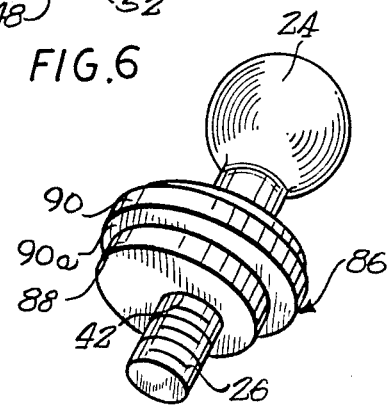
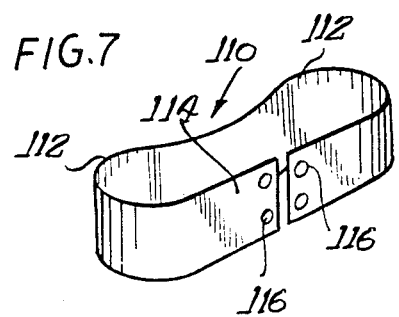
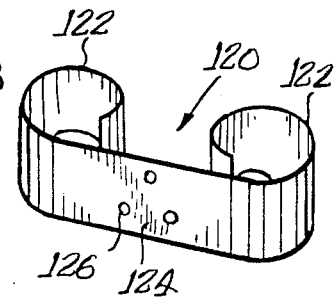

TRAILER HITCH GUIDE

BACKGROUND OF THE INVENTION

1. Field of the Invention

The present invention pertains to trailer hitches, and in particular to trailer hitches having guide walls surrounding the coupling between the trailer and a vehicle which pulls the trailer.

2. Description of the Prior Art

Many trailer hitches today use a well-known type of hitch apparatus wherein a socket on the tongue of the trailer engages a ball joint of standard size, which is mounted to the towing vehicle. Several improvements have been made to a simple ball joint mounted to a bumper. For example, U.S. Pat. Nos. 4,417,748; 4,226,438; and 3,420,549 disclose upstanding wall members partially surrounding the ball joint which act as a guide for directing the tongue of the trailer to the ball joint during a coupling operation. In addition, U.S. Pat. No. 4,417,748 provides a swivel mounting for the trailer hitch guide which follows movement of the trailer tongue as the trailer is pulled by a towing vehicle. Also included is a pin-like locking member which prohibits swiveling of the hitch guide when the pin is advanced to engage the bumper of the towing vehicle.

However, none of the aforementioned patents provide a much-needed lock for the coupling between a trailer and a towing vehicle, such as the locking arrangement shown in U.S. Pat. No. 3,522,958. The locking arrangement includes an L-bracket overlying the tongue of the trailer to prevent upward motion thereof which would result in an uncoupling with the ball joint. This locking arrangement is, however, cumbersome, involving specially-made parts which require additional assembly operations beyond that associated with coupling the trailer tongue and ball joint.

In addition to bumper-mounted hitches, hitches are sometimes provided in the bed of a truck. U.S. Pat. No. 4,183,548 discloses such an arrangement wherein a ball joint is attached to a sliding coupling, which in turn is received in a slotted plate mounted to the bed of a truck. Such arrangements are, however, unsuitable for smaller-sized trailer towed by passenger cars and the like vehicles. While a locking arrangement is provided for the intermediate ball coupling assembly, no locking is provided for the trailer coupled to the ball joint.

Sometimes, it is desirable to deter the theft of a trailer, accomplished by attaching a trailer to an authorized vehicle for its subsequent. U.S. Pat. No. 3,884,055 provides a theft deterrent in the form of a locking device including a U-shaped shackle, a plug to be received in the socket of a trailer hitch, and a pin overlying the plug and secured to the shackle. When inserted in the shackle, the free end of the pin receives a padlock to prevent its extraction. In effect, the locking arrangement is locked to the socket of the trailer with the plug member obstructing entry into the socket which is necessary for coupling to a ball joint.

SUMMARY OF THE INVENTION

It is therefore an object of the present invention to provide a trailer hitch for attachment to the bumper of a vehicle having a simplified safety lock arrangement which maintains a trailer tongue and a ball joint in a coupled configuration.

Still another object of the present invention is to provide a trailer hitch of the above-described type which is pivotally mounted with a biasing arrangement which aligns the pivoting guide in a preferred direction.

These and other objects of the present invention, which will become apparent from studying the drawings and detailed description, are provided in a trailer hitch for attachment to a bumper of a vehicle so as to provide releasable coupling with a trailer coupling member. The hitch includes a coupling ball having a top and means for attachment to the bumper. A partial enclosure partly surrounds the coupling ball, the enclosure having a wall portion extending above the top of the coupling ball and defining a slot for receiving a safety bar. A safety bar, receivable in the slot, is supported by the wall portion in overlying relationship with the coupling ball when the ball is coupled to a trailer coupling member interposed between the coupling ball and the safety bar means. Thus, unintentional uncoupling of the coupling ball and the trailer coupling member is prevented.

BRIEF DESCRIPTION OF THE DRAWINGS

In the drawings, wherein like elements are referenced alike,

FIG. 3 is a plan view of the trailer hitch of FIG. 1, showing various positions of the trailer tongue in phantom;

FIG. 4 is a cross-sectional elevational view of a trailer hitch taken along the line 4—4 of FIG. 3 and locking in the direction of the arrows;

FIG. 5 is a rear elevational view of the trailer hitch of FIG. 3, taken along the line 5—5 and looking in the direction of the arrows;

FIG. 6 is a perspective view of a ball joint and mounting bushing of the preceding figures, shown in greater detail; and FIGS. 7 and 8 are perspective views of alternative arrangements of the spring members shown in the preceding Figures.

DETAILED DESCRIPTION OF THE PREFERRED EMBODIMENT

Figure 1:
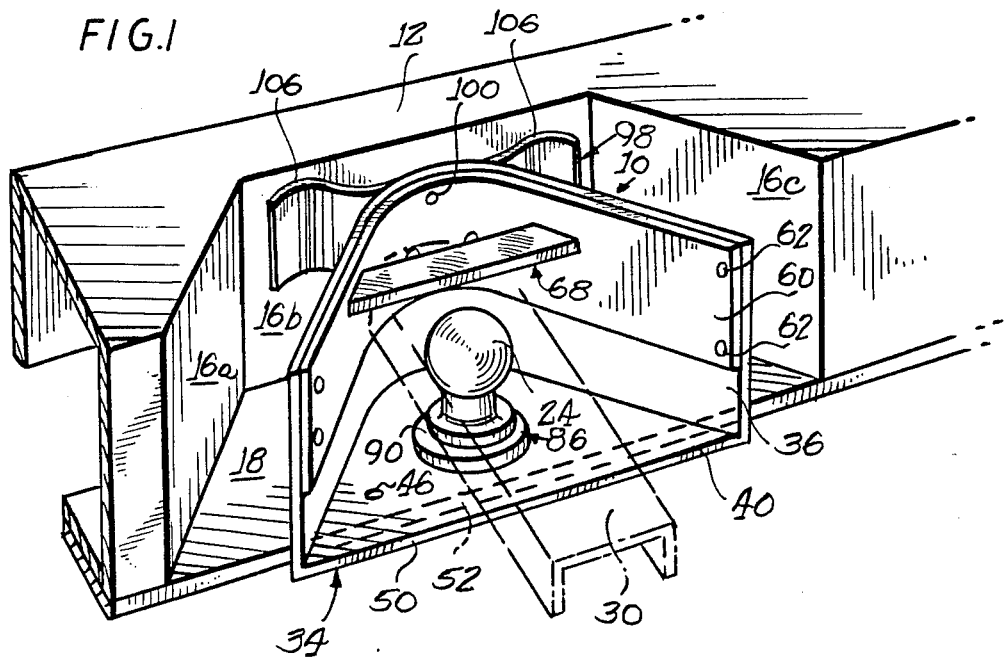
FIG. 1 is a perspective view of a trailer hitch constructed according to the preferred embodiment of the present invention.

As shown in the drawings for purposes of illustration, the invention is embodied in a trailer hitch assembly generally indicated at 10, connected to the bumper 12 of a vehicle, not shown. Bumper 12 can comprise any of the designs presently available in vehicles today. However, for purposes which will become clear herein, the bumper 12 illustrated in the drawings is particularly advantageous in that it defines a recess 14 formed by upstanding walls 16 such as the three upstanding walls 16a, b and c, as well as a lower, generally horizontal wall 18.

Figure 2:
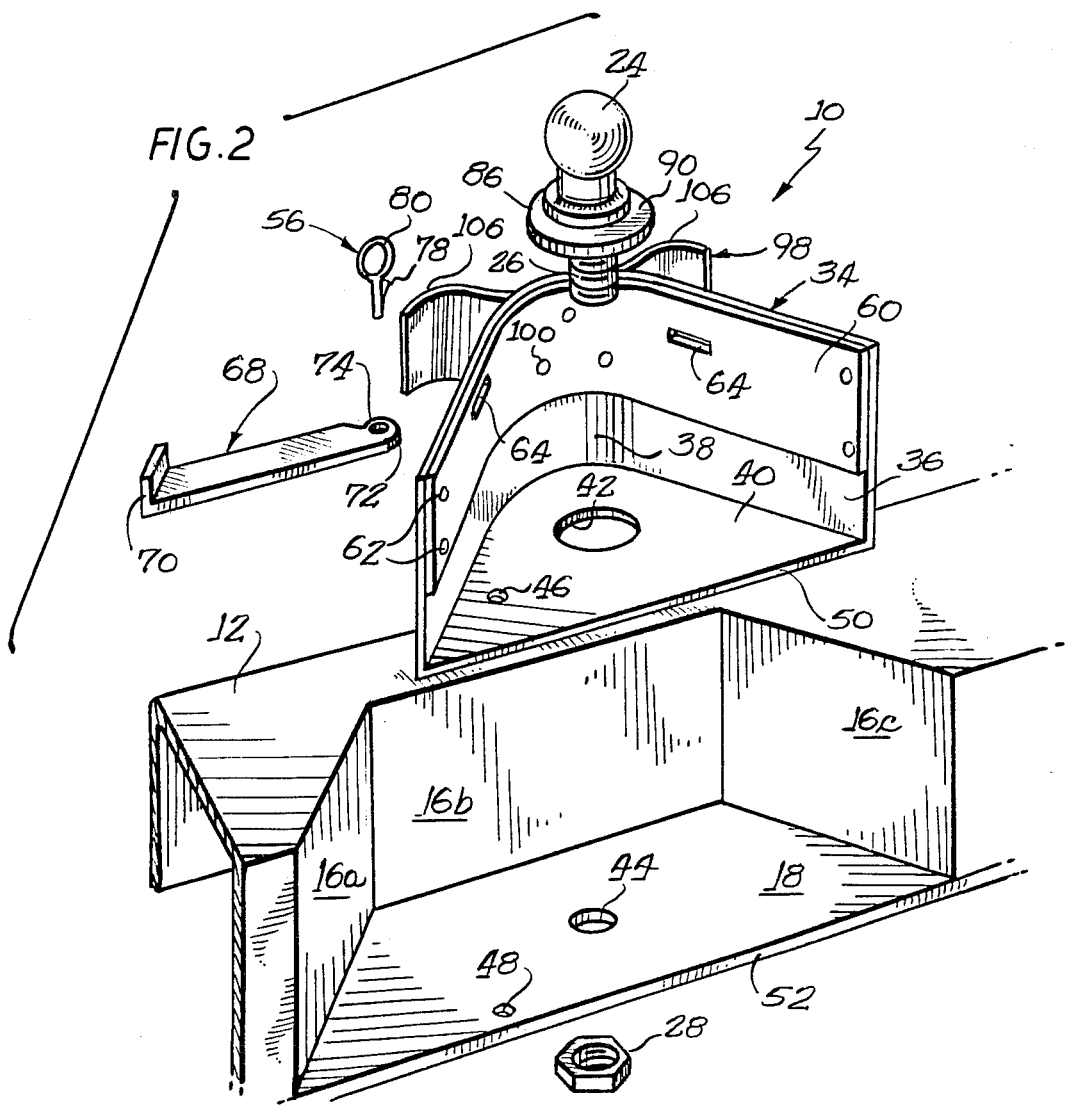
FIG. 2 is an exploded perspective view of the hitch of FIG. 1.

Secured to bottom member wall 18 is a coupling ball 24 having a threaded shaft 26 extending therefrom. The coupling ball 24 can have either a round or a flat top. As best seen in FIGS. 2, 4 and 5, shaft 26 is secured to bumper bottom wall 18 with a threaded nut 28. A trailer tongue 30 is indicated in phantom in the Figures, and as shown in FIGS. 4 and 5, defines a socket for receiving coupling ball 24 in a customary manner. Accordingly, it is preferred that the upper spherical part of coupling ball 24 be of a standard size to readily accommodate trailer hitches in use today.

In order to assist an operator in aligning a socket of the trailer tongue with the coupling ball, the present invention, in one of its aspects, provides a partial enclosure or guide, generally indicated at 34, partially surrounded the ventral, lateral, and bottom sides of coupling ball 24. Guide 34 conveniently comprises a unitary upstanding wall 36, generally V-shaped in plan, having a rounded nose portion 38 disposed between coupling ball 24 and central bumper wall 16b. Guide 34 further includes a generally triangular-shaped bottom wall 40 which overlies bottom wall 18 of bumper 12. As best seen in the exploded view of FIG. 2, bottom wall 40 defines an interior bushing-receiving aperture 42 aligned in registry with a shaft-receiving aperture 44 defined by the bottom wall 18 of bumper 12. The bottom walls 40, 18, further define pin-recieving apertures 46, 48, which are aligned in registry when the rear edge 50 of guide 34 is aligned parallel to the rear edge 52 of bumper 12.

As indicated most clearly in FIG. 1, guide 34 provides a funneling-like action when attempting to locate the socket of trailer tongue 30 over coupling ball 34 to achieve the coupled position shown in the Figures. During this time, it is convenient to locate guide 34 in a fixed position. Accordingly, in one aspect of the present invention, a safety pin 56 (see FIG. 2) is provided for sliding insertion in the apertures 46, 48 of the bottom walls 40, 18 of guide 34 and bumper 12, respectively. As will be seen, guide 34 is mounted for pivoting or swiveling as indicated by the phantom lines of FIG. 3. Engagement of pin 56 with the guide member and bumper prevents such swiveling, thereby enhancing the ability of guide 34 to funnel or direct the free end of the trailer tongue into its proper position overlying coupling ball 24. For example, if the trailer tongue 30 of FIG. 1 were initially located toward the right of its proper position it would engage the right-hand portion of upstanding wall 36, camming or sliding therealong toward the nose or central portion 38. To assist this sliding engagement, and to protect the guide 34 as well as the trailer tongue 30, a strip of Teflon, plastic or other suitable material 60 is applied to the upper interior portion of guide 34 by rivets 62. As seen most clearly in FIG. 2, a pair of opposed slot-like openings 64 are formed in upstanding wall 36, adjacent the central, nose portion 38 so as to straddle that nose portion.

A flat, blade-like safety bar 68 has a cross-sectional dimension suitable for sliding insertion through the slot-like openings 64 to achieve the position shown in FIGS. 1, and 3-5. As shown most clearly in FIGS. 3-4, safety bar 68, when fully received in slot-like opening 64, overlies at least half, but preferably a major portion of coupling ball 24, when trailer tongue 30 is coupled herewith. As illustrated in FIGS. 4 and 5, safety bar 68 is positioned above ball 24 by slot-like opening 64 so as to be positioned in close proximity to the upper surface 30a of trailer tongue 30. The safety bar 68, when so arranged, effectively prevents upward movement of trailer tongue 30, away from and out of engagement with coupling ball 24.

As indicated in FIG. 5, the height of slots 64 is carefully controlled to provide a minimum clearance "tight fit" between safety bar 68 and the trailer tongue. If the coupling ball 24 is not properly installed or the trailer tongue not properly mated with the coupling ball, then safety bar 68 will be blocked by the trailer tongue, preventing insertion through the second slot 64, thereby indicating to an operator that a misalignment has probably occurred. Differences in mating engagement, due to different between flat-top and round-top coupling balls, for example, must be accounted for in providing the necessary tight fit between the trailer hitch and safety bar.

According to one aspect of the present invention, it has been most effective to locate safety bar 24 to cover at least the forward portion of coupling ball 24 to effectively lock trailer tongue 30 in coupling relationship with coupling ball 24, despite various attitudes and inclinations of the trailer tongue. It may be desirable, especially when crossing irregular surfaces which have relatively short undulations in the direction of vehicle travel, to space safety bar 68 above the upper surface 30a of trailer tongue 30, so as to allow for vertical swiveling or rocking of the trailer tongue 30. In order to allow such movement of the trailer tongue while still maintaining coupling engagement between the trailer tongue and the coupling ball 24, a resilient spring may be attached either to the safety bar 68 or the upper surface 30a of tongue 30, although such is not required if the safety bar is spaced close enough to the upper surface of the trailer tongue.

According to other aspects of the invention, safety bar 68 is provided with an economical construction consisting of a generally flat strip-like body with a downturned end 70 acting as a stop to prevent further insertion of the safety bar through slot-like opening 64. If desired, the downturned end 70 may be upwardly turned or may be enlarged in any desirable fashion to present a cross section greater than the cross section of the slot-like openings 64. In order to ensure adequate engagement between the end of the safety bar and the upstanding wall 36, the preferred embodiment locates the downturned end at a horizontal angle, corresponding to the angle of the left-hand portion of the generally V-shaped upstanding wall 36.

The right-hand end of the illustrated safety bar 68, as shown in FIG. 2, has an eyelet 72 formed therein by stamping, so as to define a pin-receiving aperture 74 as shown most clearly in FIG. 4, locking pin 56 is inserted in aperture 74 after the safety bar is fully inserted in both slot-like openings 64, to prevent its extraction through the portions of wall 36 defining the slot-like opening 64. Accordingly, to prevent the unintentional upward creeping of pin 56, so as to come out of engagement with eyelet 72, pin 56 is conveniently provided with a retaining clip 78, which preferably comprises a small strip of spring steel attached at the lower free end of pin 56. The upper free end of clip 78 engages the underside surface of safety bar 68, but is freely compressible under finger pressure, to allow its intentional extraction therethrough. Similarly, when pin 56 is employed to secure guide 44 against swiveling, the upper end of clip 78 engages the under surface of bumper bottom wall 18. With a simple squeezing using finger pressure, the pin 56 is extracted in an upward direction. A finger hold 80 is conveniently provided for this purpose.

According to one aspect of the present invention, the same pin 56 is ultimately used for locking both guide 34 and safety bar 68 in their respective operational positions. In the first part of its use, when attaching a trailer to the hitch assembly, it is desirable to lock the guide 34 in place. At this time, pin 56 secures the guide 34 against movement relative to bumper bottom wall 18. After the trailer is positioned in place and coupling with coupling wall 24 is achieved, safety bar 68 is inserted through slot-like openings 64. Thereafter, pin 56 is extracted from the bottom wall of the bumper, and guide, being inserted through the eyelet 72 at the free end of safety bar 68, preventing its unintentional withdrawal from its locking position. Although one configuration of clip 78 is shown in the preferred embodiment, other arrangements for locking the pin 56 in it desired position, can be used. For example, a cotter pin, received in an aperture drilled at the free end of pin 56, can be used. Alternatively, the shaft-like portion of pin 56 can be threaded to receive a threaded nut or the like, although such is not generally desirable since it adds to the complexity of securing a trailer to a vehicle.

As mentioned above, guide 34 is preferably pivotally mounted to bumper 12. According to another aspect of the present invention, the swivel mounting of guide 34 is provided by a unique bushing 86 which, in the preferred embodiment, takes the form of a stepped washer. As most clearly shown in FIG. 6, bushing 86 includes a first, washer-like disk portion 88 of generally smaller size, and an overlying, larger washer-like disk portion 90. As shown in the cross-sectional views of FIGS. 4 and 5, the smaller, disk portion 88 is fully received in the bushing-receiving aperture 42, with the larger disk portion 90 overlying the upper surface of bottom guide wall 40. The bottom surface 90a of larger disk portion 90, is in bearing contact with guide wall 40, maintaining a relatively close, intimate engagement between bottom wall 40 of guide 34 and bottom wall 18 of bumper 12. With disk portion 88 received in aperture 42, pivotal or swivel mounting of the guide is provided, as apertured guide wall 40 rotates about disk portion 88.

Referring again to FIG. 6, bushing 86 is seen to include an internal pin-receiving aperture 92 for receiving the shaft-like portion of coupling ball 24. According to another aspect of the present invention, pin-receiving aperture 92 is eccentrically located with respect to the disk portions 88, 90. It is preferred that the disk portions 88, 90 be concentric with each other, but eccentric with regard to the shaft of coupling ball 24. As will now be seen, this eccentricity provides a positional adjustment of guide 34, relative to bumper 12. Preferably, guide 34 is positioned relative to bumper 12 at such time as the trailer hitch is installed to the bumper. Thereafter, nut 28 is advanced along threaded shaft 26 to lock the position of guide 34. In order to provide the desired locking of guide 34, while still allowing a minute amount of clearance within which bottom guide wall 18 can swivel, threaded shaft 26 may be provided with an over-sized stepped portion with a free end adjacent the free end of shaft 26 so as to provide a stop surface preventing further advancement of nut 28 upwardly toward the spherical coupling portion of connector ball 24.

As mentioned above, it is desirable to lock guide 34 in place with pin 56 prior to advancing trailer tongue 30 in position. To assist in aligning pin-receiving aperture 46 with pin-receiving aperture 48 of bumper 12, a double-ended spring 98 is mounted to the forward, central or nose portion 38 of upstanding wall 36. Preferably, spring 98 is riveted or otherwise bolted to, nose portion 38 by rivets or bolts 100, using a washer 102. As shown in the preferred embodiment, prominent spring portions 106 preferably engage the central wall 16b of bumper 12. With reference to FIG. 3, it can now be seen that if guide 34 is pivoted to the left or to the right, spring 98 will deflect the guide 34 to its desired, aligned position indicated in FIG. 1, whereat pin-receiving apertures 46, 48 are aligned. Thus, spring 98 aids in aligning guide 34 preparatory to the insertion of pin 56 which fixes guide 34 in a centered position, useful for aligning trailer tongue 30 with respect to coupling ball 24.

After the trailer is coupled to hitch assembly 10, and pin 56 is relocated to the eyelet 72 of safety bar 68, guide 34 is again free to swivel or pivot in a generally horizontal plane. Spring 98 will, in general, maintain guide 34 in its centered position except when the spring force is overcome by an extreme swinging excursion of the trailer tongue 30. It is important to note that, regardless of the pivoted or swinging position of guide 34, safety bar 68 at all times overlies coupling ball 24 and more specifically, the portion of trailer tongue 30 overlying coupling ball 24, thereby maintaining coupled engagement therebetween. As pointed out above, safety bar 68 can be made considerably wider than the diameter of coupling ball 24, it merely being necessary to block the free end of trailer tongue 30 from upward dislocation movement away from coupling ball 24. If safety bar 68 is made wide enough it need not be aligned with the axis of the mounting shaft of coupling ball 24. However, in the preferred embodiment, safety bar 68 preferably has the lateral dimensions shown, leading to a lightweight, inexpensive construction. As indicated, the dorsal edge of safety bar 68 overlies or lies slightly to the rear of the central axis of coupling ball 24, and since safety bar 68 is mounted by guide 34 which shares the same pivot axis as coupling ball 24, relative alignment between safety bar 68 and coupling ball 24 is at all times maintained regardless of the angular position of guide 34. This also contributes to a lightweight, simplified construction as noted.

Referring now to FIGS. 7 and 8, two alternative embodiments of the spring member are shown. Referring first to FIG. 7, a spring 110 has dual prominent portions or lobes 112 for the purpose indicated above with respect to spring 98. Instead of a central mounting, two free ends 114 of spring 110 include mounting apertures 116 for receiving rivets or screws 100 in the manner described above with respect to FIG. 3. Referring now to FIG. 8, spring 120 has curled free ends forming prominent portions 122 for engaging the central upright wall 16b of trailer 12. The midportion 124 of spring 120 includes apertures 126 for receiving mounting rivets or screws 100. In operation, the springs 110, 120 function as described as above with respect to FIG. 3.

Although a bumper 12 is shown having a recess, the coupling ball and guide can be attached to a conventional draft bar projecting below and behind the bumper of a passenger vehicle, for example. The prominent spring positions in this arrangement will contact the rear bumper to provide centered biasing. Either the vehicle bumper or the prominent spring portions can be coated with plastic or the like to prevent damage to the bumper finish.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A trailer hitch for attachment to a bumper of a vehicle so as to provide releasable coupling with a trailer coupling member, said hitch comprising:

a coupling ball having a top and means for attachment to the bumper;

partial enclosure means partly surrounding said coupling ball having a wall portion extending above the top of said coupling ball and defining slot means for receiving a safety bar, said partial enclosure means further having means for attachment to the bumper; and safety bar means receivable in said slot means so as to be supported by said wall portion in overlying relationship with said coupling ball when said coupling ball is coupled to a trailer coupling member interposed between said coupling ball and said safety bar means, whereby unintentional uncoupling of said coupling ball and the trailer coupling member is prevented.

2. The trailer hitch of claim 1 wherein said partial enclosure means includes a base member pivotally mounted to said bumper and said trailer hitch further includes means for alternately locking said partial enclosure means and said locking bar in respective selected positions.

3. The trailer hitch of claim 2 wherein said base member and said safety bar include pin-receiving apertures and said means for alternately locking comprises a locking pin alternately receivable in pin-receiving aperture means defined in said base member and in said bumper to prevent relative movement therebetween and in pin-receiving aperture means in said safety bar to prevent withdrawal of said safety bar through said wall portion slot means when said safety bar is received therein.

4. The trailer hitch of claim 3 wherein said safety bar has a body portion and a first end of cross-sectional dimension for insertion through said partial enclosure slot means, said safety bar further including a second opposed end dimensioned to block passage through said partial enclosure slot means, and said first end defining the pin-receiving aperture means for receiving said locking pin.

5. The trailer hitch of claim 1 wherein said partial enclosure means includes an upstanding wall between said coupling ball and at least one of the bumper and the vehicle, said means for attaching the partial enclosure means to the bumper pivotally mounting said partial enclosure means to the bumper so as to provide pivotal movement thereof between first and second positions, said hitch further comprising:

spring means mounted to said upstanding wall for contacting at least one of the bumper and the vehicle when said partial enclosure means is pivoted away from the first position, said spring means biases said partial enclosure means toward that first position.

6. The trailer hitch of claim 5 wherein said spring means includes end portions for contacting said vehicle and an intermediate portion for mounting to said upstanding wall.

7. The trailer hitch of claim 1 wherein said means for attaching said coupling ball to a bumper includes a threaded shaft having a cross-section dimensioned to be received in an aperture defined in the bumper, said partial enclosure means including a base member defining a bushing-receiving aperture significantly larger than the cross-sectional dimension of said threaded shaft, said hitch including eccentric bushing means receivable in said base member and defining an inner shaft-receiving aperture for receiving said coupling ball shaft, eccentrically located with respect to said bushing-receiving aperture.

8. The trailer hitch of claim 7 wherein said eccentric bushing means comprises a stepped washer defining said inner shaft-receiving aperture and two outer portions of different diameter, the smaller diameter portion dimensioned to be received in said bushing-receiving aperture, with the larger diameter portion overlying said base member so as to receive bearing support from said swivel plate, said inner shaft-receiving aperture eccentrically positioned with respect to the smaller outer portion of said stepped washer to provide an adjustment in the position of said base member relative to said vehicle bumper.

* * * * *